US012799672B2

(12) United States Patent
Oh

(10) Patent No.: US 12,799,672 B2
(45) Date of Patent: Nov. 17, 2026

(54) APPARATUS FOR CORRECTING DYE MIXING RATIO AND METHOD THEREOF

(71) Applicant: Electronics and Telecommunications Research Institute, Daejeon (KR)

(72) Inventor: Hyun Woo Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 403 days.

(21) Appl. No.: 18/518,745

(22) Filed: Nov. 24, 2023

(65) Prior Publication Data

US 2024/0175202 A1 May 30, 2024

(30) Foreign Application Priority Data

Nov. 30, 2022 (KR) ........................ 10-2022-0163796

(51) Int. Cl.
*D06P 1/00* (2006.01)
*G01J 3/46* (2006.01)

(52) U.S. Cl.
CPC ............ *D06P 1/0032* (2013.01); *G01J 3/463* (2013.01); *G01J 2003/467* (2013.01)

(58) Field of Classification Search
None
See application file for complete search history.

(56) References Cited

U.S. PATENT DOCUMENTS

| | | | |
|---|---|---|---|
| 6,337,923 | B1 | 1/2002 | Yoon et al. |
| 10,283,956 | B2 | 5/2019 | Parker et al. |
| 10,564,037 | B2 | 2/2020 | Jang et al. |

FOREIGN PATENT DOCUMENTS

| | | | |
|---|---|---|---|
| CN | 110287623 | * | 9/2019 |
| JP | WO2015/108200 | A1 | 3/2017 |
| JP | 2021-188046 | A | 12/2021 |
| KR | 10-1999-0053702 | A | 7/1999 |
| KR | 20010113484 | * | 12/2001 |
| KR | 10-2015-0012608 | A | 2/2015 |
| WO | 2015/012476 | A1 | 1/2015 |

OTHER PUBLICATIONS

Machine Translation of CN110287623 (Year: 2019).*
Machine Translation of KR20010113484 (Year: 2001).*

* cited by examiner

*Primary Examiner* — Shawn Mckinnon
(74) *Attorney, Agent, or Firm* — LRK PATENT LAW FIRM

(57) ABSTRACT

The present invention relates to an apparatus for correcting a dye mixing ratio, the apparatus including a memory, and a processor connected to the memory, wherein, upon receiving a dyeing order including a first computer color matching (CCM) colorimetric value requested by a client, the processor uses at least one of the first CCM colorimetric value, a currently selected dye mixing ratio, a second CCM colorimetric value measured in a dyeing process, fabric characteristic data, and dye characteristic data and corrects the dye mixing ratio so that deviation between the first CCM colorimetric value and the second CCM colorimetric value is minimized.

18 Claims, 5 Drawing Sheets

100

APPARATUS FOR CORRECTING DYE MIXING RATIO AND METHOD THEREOF

CROSS-REFERENCE TO RELATED APPLICATION

This application claims priority to and the benefit of Korean Patent Application No. 10-2022-0163796, filed on Nov. 30, 2022, the disclosure of which is incorporated herein by reference in its entirety.

BACKGROUND

1. Field of the Invention

The present invention relates to an apparatus for correcting a dye mixing ratio and a method thereof, and more particularly, to an apparatus for correcting a dye mixing ratio and a method thereof capable of correcting computer color matching (CCM) colorimetric deviation in consideration of fabric characteristic data and dye characteristic data.

2. Description of Related Art

A dyeing process is a process in which a fabric requested by a client is dyed a color requested by the client. A client's order comes with a CCM QTX file measured from a standard light source (U3500, D65, A/10, or the like), a color chip, a swatch sample, and the like. The CCM QTX file may not contain light source information, and in this case, the client notifies of which light source has been used to measure the CCM QTX file. The color chip and the swatch sample are pieces of fabric presented by the client that show the color and texture that the client wants the corresponding fabric to obtain through the dyeing process.

When a client's order is received, a QTX file is read using a light source suggested by the client through a CCM colorimeter, or a color chip and a swatch sample are measured through the CCM colorimeter. The CCM colorimeter shows a color requested by the client in a set light source as X, Y, and Z values in a color space coordinate system. X, Y, and Z values measured under the same light source condition (D65) by performing dyeing with each limited concentration based on monochromatic dyes used in the corresponding dye works are input as raw data in a CCM colorimetric system. From the raw data, monochromatic dyes may be selected in relation to results of measuring the QTX file, color chip, swatch sample, and the like presented by the client using the CCM colorimeter, and mixing ratios of the selected monochromatic dyes may be simulated by calculating deviations of the X, Y, and Z values which are the raw data. Among the simulated and recommended dye mixing ratios, a dye mixing ratio considered to be the most suitable is selected, and a beaker test (B/T) is conducted at a laboratory level. The fabric dyed as a result of the beaker test (B/T) is measured using the CCM colorimeter, and the beaker test (B/T) is repeatedly performed to reduce a deviation from an original CCM value requested by the buyer. Once the dye mixing ratio is found through the beaker test (B/T), experimental dyeing is performed using a 100 kg dyeing machine. When the color requested by the buyer can be met in experimental dyeing, bulk dyeing is performed on site. On-site bulk dyeing is performed using a dyeing machine having a capacity in a range of 500 kg to 1,500 kg. For both experimental dyeing and on-site bulk dyeing, a process of reducing a color difference from the original CCM value requested by the client is performed through a sample test and CCM color measurement for the fabric obtained as a result of dyeing. When the dyeing process is completed, a post-treatment process in which the texture and luster desired by the client are imparted to the fabric is performed, and after the post-treatment process is completed, a final inspection is performed, and then fair-quality dyed products are shipped out. A deviation from the original CCM value requested by the client is checked through CCM color measurement also in the inspection process.

However, on site, increase/decrease ratios of monochromatic dyes are set and corrected by know-how of an on-site worker after the worker looks at data values obtained by CCM color measurement or distances and deviations (+ values, − values) on graphs. This is because the values are results from CCM color measurement using the same light source (for example, D65) for pieces of fabric obtained by dyeing with limited concentrations (for example, 0.1%, 0.5%, 1.0%, 3.0%, 5.0%, and the like) of monochromatic dyes based on pieces of fabric (for example, 100% cotton, 40-count fabric) having the same raw data stored in the CCM colorimeter. Therefore, characteristics of the pieces of fabric are often quite different from characteristics of pieces of fabric dyed on site, and the types of fabric used on site are very diverse. Also, a dissolution characteristic, a reaction temperature, conditions, and the like are different for each monochromatic dye, and an absorption wavelength, an absorption rate, a color strength, and the like are also different for each monochromatic dye. In addition, an absorption wavelength, a color strength, and the like may be different for each dye concentration. For this reason, in many cases, the functions provided by the CCM colorimetric system are used for reference, and the dyeing process is performed by on-site know-how when dyeing is actually performed on site.

The related art has disadvantages in that, in calculating, through CCM colorimetric deviation, a color difference generated between a dye mixing ratio prescription according to CCM color measurement and a dyeing process performed on site, reference values that allow characteristics of fabric to be dyed and dye characteristic data, which is a basis of a dye mixing ratio, to be utilized on site are not presented, and the characteristics of the fabric and the dye characteristic data are not utilized in a method for correcting the CCM colorimetric deviation.

SUMMARY OF THE INVENTION

The present invention is directed to an apparatus for correcting a dye mixing ratio and a method thereof capable of correcting computer color matching (CCM) colorimetric deviation in consideration of fabric characteristic data and dye characteristic data.

According to an aspect of the present invention, there is provided an apparatus for correcting a dye mixing ratio, the apparatus including a memory, and a processor connected to the memory, wherein, upon receiving a dyeing order including a first computer color matching (CCM) colorimetric value requested by a client, the processor uses at least one of the first CCM colorimetric value, a currently selected dye mixing ratio, a second CCM colorimetric value measured in a dyeing process, fabric characteristic data, and dye characteristic data and corrects the dye mixing ratio so that deviation between the first CCM colorimetric value and the second CCM colorimetric value is minimized.

The processor may calculate the deviation between the first CCM colorimetric value and the second CCM colorimetric value, position the dye mixing ratio on a coordinate system, calculate concentrations for each dye for position movement of the dye mixing ratio based on prestored dye characteristic data for the concentrations for each dye and the deviation, and use at least one of the calculated concentrations for each dye, the dye characteristic data, and the fabric characteristic data and calculate a correction value for the dye mixing ratio to reproduce a color requested by the client.

The processor may calculate a correction factor for the position movement of the dye mixing ratio based on the dye characteristic data and the fabric characteristic data and may use the correction factor to correct the calculated concentrations for each dye.

The processor may generate a learning data set for the concentrations for each dye based on the dye characteristic data and the fabric characteristic data.

The processor may generate the dye characteristic data for the concentrations for each dye by mapping the dye characteristic data with CCM raw data for each dye and each concentration and may generate the learning data set through data augmentation based on the dye characteristic data for the concentrations for each dye.

The processor may calculate dispersions and deviations for each concentration based on the dye characteristic data for the concentrations for each dye, calculate a distribution based on the dispersions and the deviations for each concentration, and augment the dye characteristic data for the concentrations for each dye based on the distribution, thereby generating the learning data set.

The dye characteristic data may include at least one of a chemical structure, a molecular weight, an absorption wavelength, a color strength, a solubility, a dispersion point, a reaction point, an exhaustion rate, and a fixing rate of a dye.

The fabric characteristic data may include at least one of a type, components, construction, a cotton count, a yarn twist number, a thickness, and a composition of fabric.

According to another aspect of the present invention, there is provided an apparatus for correcting a dye mixing ratio, the apparatus including a memory, and a processor connected to the memory, wherein the processor generates a learning data set for concentrations for each dye based on dye characteristic data and fabric characteristic data and uses at least one of the learning data set, a first CCM colorimetric value requested by a client, a second CCM colorimetric value measured in a dyeing process, a currently selected dye mixing ratio, and the fabric characteristic data to correct the dye mixing ratio.

The processor may generate dye characteristic data for the concentrations for each dye by mapping the dye characteristic data with CCM raw data for each dye and each concentration and may generate the learning data set through data augmentation based on the dye characteristic data for the concentrations for each dye.

The processor may calculate dispersions and deviations for each concentration based on the dye characteristic data for the concentrations for each dye, calculate a distribution based on the dispersions and the deviations for each concentration, and augment the dye characteristic data for the concentrations for each dye based on the distribution, thereby generating the learning data set.

The dye characteristic data may include at least one of a chemical structure, a molecular weight, an absorption wavelength, a color strength, a solubility, a dispersion point, a reaction point, an exhaustion rate, and a fixing rate of a dye.

The fabric characteristic data may include at least one of a type, components, construction, a cotton count, a yarn twist number, a thickness, and a composition of fabric.

The processor may calculate deviation between the first CCM colorimetric value and the second CCM colorimetric value, position the dye mixing ratio on a coordinate system, calculate concentrations for each dye for position movement of the dye mixing ratio based on the deviation and the dye characteristic data for each concentration, and use at least one of the calculated concentrations for each dye, the learning data set, and the fabric characteristic data and calculate a correction value for the dye mixing ratio to reproduce a color requested by a buyer.

According to still another aspect of the present invention, there is provided a method for correcting a dye mixing ratio, the method including an operation in which a processor receives a dyeing order including a first computer color matching (CCM) colorimetric value requested by a client, and an operation in which the processor uses at least one of the first CCM colorimetric value, a currently selected dye mixing ratio, a second CCM colorimetric value measured in a dyeing process, fabric characteristic data, and dye characteristic data and corrects the dye mixing ratio so that deviation between the first CCM colorimetric value and the second CCM colorimetric value is minimized.

The operation in which the processor corrects the dye mixing ratio may include an operation in which the processor calculates the deviation between the first CCM colorimetric value and the second CCM colorimetric value and positions the dye mixing ratio on a coordinate system, an operation in which the processor calculates concentrations for each dye for position movement of the dye mixing ratio based on prestored dye characteristic data for the concentrations for each dye and the deviation, and an operation in which the processor uses at least one of the calculated concentrations for each dye, the dye characteristic data, and the fabric characteristic data and calculates a correction value for the dye mixing ratio to reproduce a color requested by the client.

The method may further include an operation in which the processor generates a learning data set for the concentrations for each dye based on the dye characteristic data and the fabric characteristic data.

In the operation in which the processor generates the learning data set, the processor may generate the dye characteristic data for the concentrations for each dye by mapping the dye characteristic data with CCM raw data for each dye and each concentration, may calculate dispersions and deviations for each concentration based on the dye characteristic data for the concentrations for each dye, may calculate a distribution based on the dispersions and the deviations for each concentration, and may augment the dye characteristic data for the concentrations for each dye based on the distribution, thereby generating the learning data set.

The dye characteristic data may include at least one of a chemical structure, a molecular weight, an absorption wavelength, a color strength, a solubility, a dispersion point, a reaction point, an exhaustion rate, and a fixing rate of a dye.

The fabric characteristic data may include at least one of a type, components, construction, a cotton count, a yarn twist number, a thickness, and a composition of fabric.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
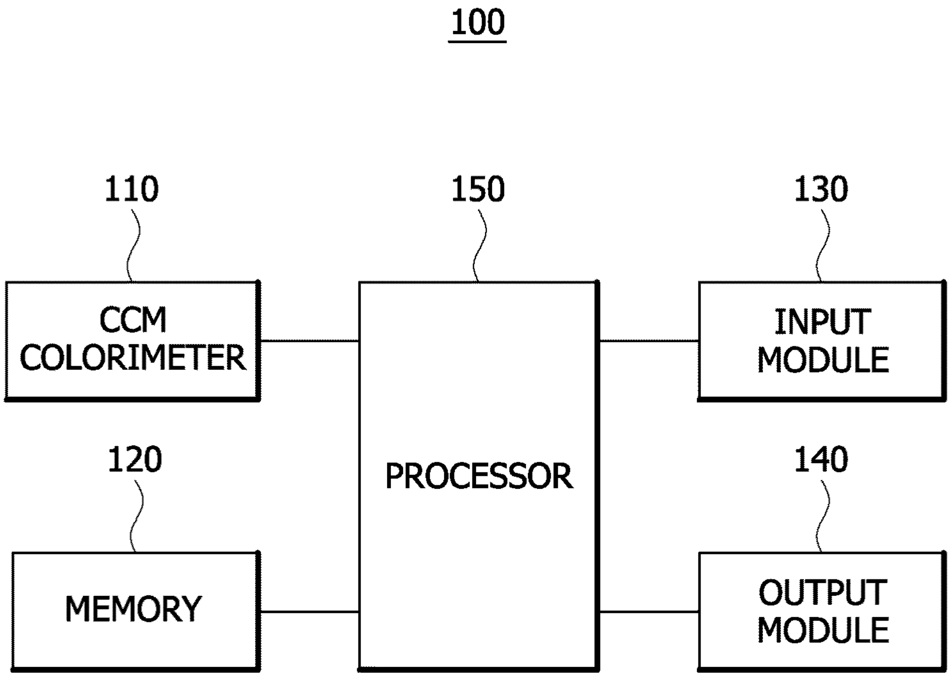
FIG. 1 is a block diagram for describing an apparatus for correcting a dye mixing ratio according to one embodiment of the present invention.

Hereinafter, an apparatus for correcting a dye mixing ratio and a method thereof according to one embodiment of the present invention will be described in detail with reference to the accompanying drawings. In this process, thicknesses of lines or sizes of components illustrated in the drawings may be exaggerated for clarity and convenience of description. Also, terms used below are terms defined in consideration of functions in the present invention and may be changed according to an intention or customary practice of a user or an operator. Therefore, the terms should be defined based on the content throughout the present specification.

In the conventional CCM colorimetric system, single fabric (100% cotton) is dyed with concentrations (about five concentrations) for each dye, X, Y, and Z values in a color space are input as raw data through CCM color measurement, and then the fabric and color requested by a client are measured and checked using a CCM colorimeter. Then, when a worker selects monochromatic dyes, which are input as the raw data, as a candidate group, the CCM colorimetric system calculates a prescription of a mixing ratio of the monochromatic dyes selected by the worker through a simulation based on the raw data and performs a beaker test (B/T) based on the prescription. Then, the CCM colorimetric system measures a result of the beaker test (B/T) through the CCM colorimeter, calculates deviation of a CCM colorimetric value, which is obtained by measuring the result of the beaker test (B/T), relative to an initial original CCM colorimetric value, and displays the deviation with a number on a screen to allow the worker to check the deviation. Then, the CCM colorimetric system lets the worker determine a dye to be corrected and a way of correcting the dye by know-how of the worker, or when a library license relating to re-prescription is purchased, outputs a dye mixing ratio selected by the worker as a ratio value for re-prescription.

However, in the conventional CCM colorimetric system, since all calculations are performed based on the raw data through CCM color measurement after dyeing the single fabric (100% cotton) with concentrations (five concentrations) for each dye, characteristics of numerous types of fabric dyed in an on-site dyeing process are not considered at all, and experimental data relating to characteristics of dyes (a chemical structure, a molecular weight, an absorption wavelength, a color strength, a solubility, a dispersion point, a reaction point, an exhaustion rate, a fixing rate, and the like thereof) is not considered. Thus, repeated trial and error occur in a beaker test (B/T), experimental dyeing, on-site dyeing, and the like which are performed to reproduce a color on fabric requested by a client. As a result, significant loss occurs in terms of time, manpower, water, dyes, an auxiliary agent, chemicals, energy, and the like, which is a factor that hinders productivity of dye works.

Accordingly, the present invention relates to an apparatus for correcting a dye mixing ratio and a method thereof that can, in order to address repeated trial and error in satisfying a CCM colorimetric value requested by a client through CCM color measurement during a beaker test (B/T), experimental dyeing, and on-site dyeing, secure a learning data set through augmentation of data relating to different concentrations for each dye based on fabric characteristic data that distinguishes fabric characteristics and experimental dye characteristic data that shows characteristics of dyes, and based on the secured learning data set, use a dye mixing ratio correction algorithm, which is for correcting a color difference between the CCM colorimetric value requested by the client and a CCM colorimetric value measured in a dyeing process, to reduce trial and error relating to a color difference between the color requested by the client and the color in the dyeing process and find a dye mixing ratio.

Also, according to the present invention, the fabric characteristics distinguish basic fabrics such as cotton, rayon, and modal, distinguish whether the basic fabric contains polyester, distinguish whether the basic fabric contains spandex, distinguish whether the fabric is woven or knitted, distinguish a twist number of yarn constituting the fabric and a cotton count of the fabric, distinguish a fabric thickness through g/yard or g/$m^2$ of pure fabric, and when the fabric is not pure basic fabric, distinguish a composition of the fabric. According to the present invention, when such fabric characteristics are considered, according to which fabric the basic fabric is or whether the basic fabric is mixed with polyester, dyes that may be selected may be distinguished from dyes having similar shades, and the fabric characteristics may be reference data for finding a dye mixing ratio. Therefore, the present invention relates to an apparatus for correcting a dye mixing ratio and a method thereof in which the fabric characteristics are considered.

Also, the present invention relates to an apparatus for correcting a dye mixing ratio and a method thereof that can constitute a dye characteristic data set using information presented from a dye company and data that may be collected through experiments, such as a chemical structure indicating a molecular structure, a molecular weight, an absorption wavelength, a color strength, a solubility, a dispersion point, a reaction point, an exhaustion rate, and a fixing rate of a dye, use the dye characteristic data set as reference data for finding a dye mixing ratio to perform correlational analysis, and allow the dye characteristic data set to be utilized as a data set for correcting a dye mixing ratio according to CCM color measurement in a dyeing process.

Also, the present invention relates to an apparatus for correcting a dye mixing ratio and a method thereof that can secure a dye characteristic data set through an experiment with different concentrations for each dye, calculate dispersions and deviations for each concentration based on dye characteristic data for each concentration, and calculate a distribution and apply the distribution to a data augmentation technique to sufficiently secure a learning data set for different concentrations for each dye.

In addition, the present invention relates to an apparatus for correcting a dye mixing ratio and a method thereof that can, when a first CCM colorimetric value requested by a client, a dye mixing ratio, and a second CCM colorimetric value in a beaker test (B/T), experimental dyeing, and on-site dyeing are given as inputs, not only calculate deviation on a CCM coordinate system but also position the dye mixing ratio, and calculate a correction factor for position movement of the dye mixing ratio based on dye characteristic data and fabric characteristic data to correct the dye mixing ratio, thereby reducing trial and error compared to the related art and producing a dyeing color requested by the client.

Figure 2:
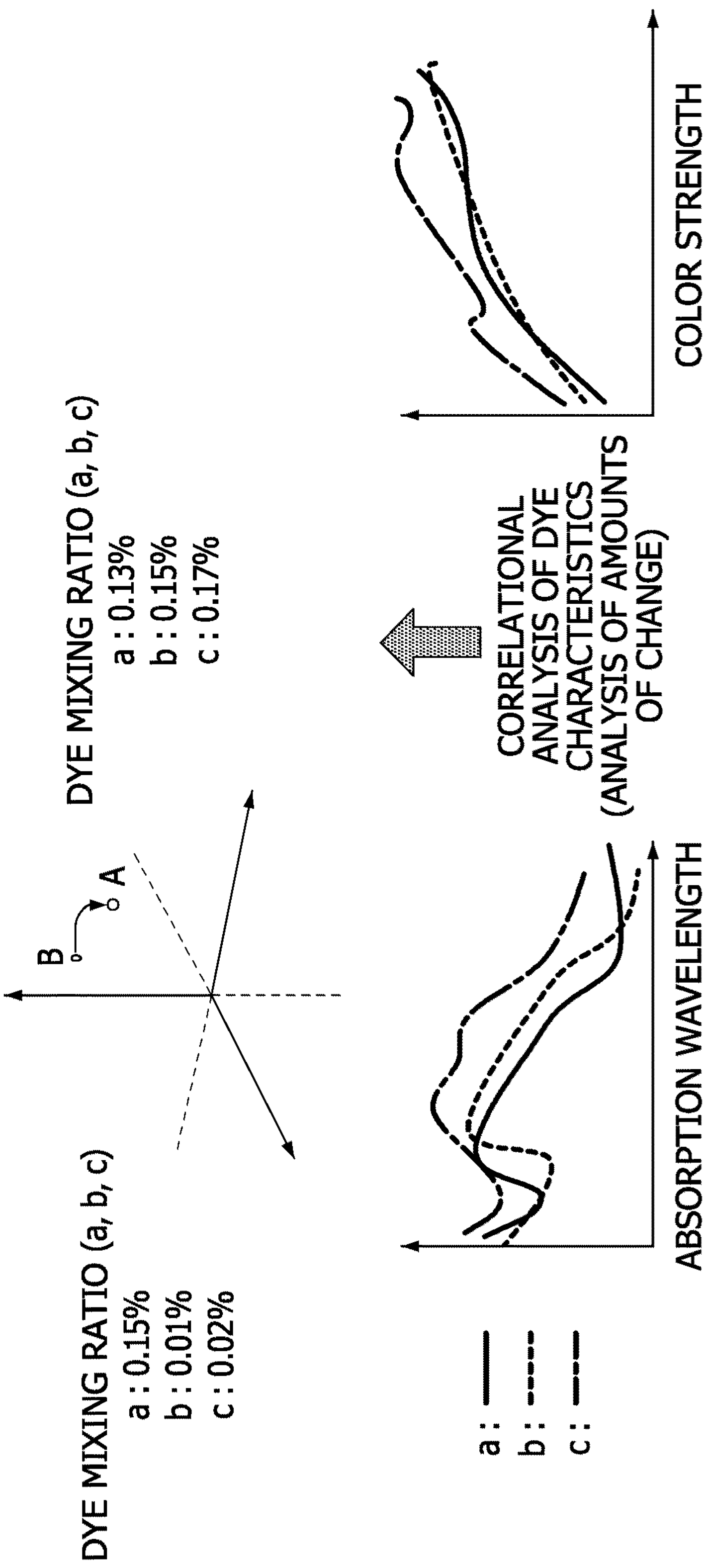
FIG. 2 is an exemplary view for describing a method for correcting a dye mixing ratio according to one embodiment of the present invention.

FIG. 1 is a block diagram for describing an apparatus for correcting a dye mixing ratio according to one embodiment of the present invention, and FIG. 2 is an exemplary view for describing a method for correcting a dye mixing ratio according to one embodiment of the present invention.

Referring to FIG. 1, a dye mixing ratio correction apparatus 100 according to one embodiment of the present invention includes a CCM colorimeter 110, a memory 120, an input module 130, an output module 140, and a processor 150.

When a dyeing order is received from a client, the CCM colorimeter 110 may read a QTX file using a light source suggested by the client or may measure CCM from a color chip and a swatch sample and store a CCM colorimetric value obtained by the CCM measurement in the memory 120. The dyeing order may include a CCM QTX file, a color chip, a swatch sample, and the like, and the color chip and the swatch sample may be pieces of fabric.

The CCM colorimeter 110 may show the color requested by the client in the set light source as X, Y, and Z values in a color space coordinate system.

The memory 120 is a component for storing data relating to the operation of the dye mixing ratio correction apparatus 100. In particular, an application (a program or an applet) for generating a learning data set relating to concentrations for each dye based on fabric characteristic data and dye characteristic data and using at least one of a first CCM colorimetric value requested by the client, a second CCM colorimetric value measured in a dyeing process, a currently selected dye mixing ratio, and the fabric characteristic data to correct the dye mixing ratio may be stored in the memory 120, and information stored in the memory 120 may be chosen by the processor 150 as necessary. That is, various types of data generated in a process of running an operating system or an application (a program or an applet) for the operation of the dye mixing ratio correction apparatus 100 are stored in the memory 120. Here, "memory 120" collectively refers to a nonvolatile storage device that continues to keep information stored therein even when power is not supplied and a volatile storage device that needs power to keep information stored therein. Also, the memory 120 may perform a function of temporarily or permanently storing data processed by the processor 150. Here, examples of the memory 120 may include magnetic storage media or flash storage media in addition to the volatile storage device that needs power to keep information stored therein, but the scope of the present invention is not limited thereto.

The input module 130 is provided to input the first CCM colorimetric value requested by the client, a dye mixing ratio, and the like. For example, the input module 130 may be provided as a user interface such as a keyboard, a mouse, a touchpad, a touchscreen, an electronic pen, or a touch button.

The output module 140 may output a dye mixing ratio or the like corrected by control of the processor 150. The output module 140 may be implemented as a printer, a display, or the like. Here, for example, the display may be implemented as a thin film transistor-liquid crystal display (TFT-LCD) panel, a light emitting diode (LED) panel, an organic LED (OLED) panel, an active-matrix OLED (AMOLED) panel, a flexible panel, or the like.

The processor 150 may be implemented as at least one of an application-specific integrated circuit (ASIC), a digital signal processor (DSP), programmable logic devices (PLDs), field programmable gate arrays (FPGAs), a central processing unit (CPU), microcontrollers, and/or microprocessors.

The processor 150 may generate a learning data set through augmentation of data relating to different concentrations for each dye based on fabric characteristic data and dye characteristic data.

Also, upon receiving a dyeing order including a first CCM colorimetric value requested by the client, the processor 150 may use at least one of the first CCM colorimetric value, a currently selected dye mixing ratio, a second CCM colorimetric value measured in a dyeing process, fabric characteristic data, and dye characteristic data and correct the dye mixing ratio so that deviation between the first CCM colorimetric value and the second CCM colorimetric value is minimized.

Hereinafter, the operation of the processor 150 will be described in detail.

The processor 150 may generate a learning data set through augmentation of data relating to different concentrations for each dye based on fabric characteristic data and dye characteristic data.

The fabric characteristic data may include a type, components, construction, a cotton count, a yarn twist number, a thickness, a composition, and the like of fabric. That is, fabric characteristics may distinguish basic fabrics such as cotton, rayon, and modal and distinguish whether the basic fabric contains polyester. That is, when the basic fabric is fabric containing polyester, the amount of contained polyester is shown by composition. For example, the amount of contained polyester may be shown as 60% cotton+40% polyester. Also, fabric characteristics may distinguish whether the basic fabric contains spandex. In the case of fabric containing spandex, since the fabric has a property of being flexible and stretchy, a pre-setting process in which the fabric is fixed at a high temperature through a pre-setting process is added. Therefore, the fabric characteristics may distinguish whether the basic fabric contains spandex. Also, the basic fabric contains both polyester and spandex in some cases. In such cases, since pre-setting and dyeing processes become more complex, dyes that may be used are inevitably more limited. Also, fabric characteristics may differ according to whether fabric is woven or knitted when being produced, in addition to being distinguished according to the type of fabric. Therefore, the fabric characteristics may distinguish whether the fabric is woven or knitted. Also, even in the case of yarn which is a raw material for producing fabric, the yarn has a twist number, and a property in which a dye is exhausted or fixed may differ according to the twist number of the yarn. Therefore, the fabric characteristics may distinguish a twist number of yarn constituting the fabric and a cotton count of the fabric. Here, the cotton count of the fabric indicates a thickness of a thread (a length of the thread obtained from 1 g of cotton) used in the fabric. Also, the fabric characteristics may distinguish a fabric thickness through g/yard or g/m$^2$ of pure fabric. Also, when the fabric is not pure basic fabric, the fabric characteristics may distinguish a composition of the fabric. When such fabric characteristics are considered, according to which fabric the basic fabric is or whether the basic fabric is mixed with polyester, dyes that may be selected may be distinguished from dyes having similar shades, and the fabric characteristics may be reference data for finding a dye mixing ratio.

The fabric characteristic data may be factors that determine a dye mixing ratio and a dyeing process in a dyeing process which is completed by combining fabric and dyes. That is, the fabric characteristic data allows dyes that may be used and dyes that cannot be used to be distinguished according to fabric characteristics, and the fabric characteristic data may be used as conditions for correcting a dye mixing ratio by analyzing conditions for an exhaustion rate or the like of a dye according to fabric characteristics. Based on a learning data set relating to dyes previously selected to dye the corresponding fabric and a dye mixing ratio of the selected dyes, the fabric characteristic data may recommend a candidate group of dyes having a good combination through an artificial intelligence (AI) model of a candidate group of monochromatic dyes that has been previously selected by a worker.

The dye characteristic data may include a chemical structure, a molecular weight, an absorption wavelength, a color strength, a solubility, a dispersion point, a reaction point, an exhaustion rate, a fixing rate, and the like of a dye.

A dye has a molecular structure. Therefore, when a chemical structure, a molecular weight, and the like of a dye are known, chemical characteristics of the corresponding dye may be interpreted. Dyeing is performed by combining dyes and fabric according to dyeing conditions (a bath ratio, a temperature, a temperature rising condition, an amount of added soda ash/sodium sulfate, the time at which soda ash/sodium sulfate is added, and the like), time, and the like. Therefore, datafication of absorption wavelengths that dyes exhibit for each concentration under dyeing conditions, color strengths of the dyes, and the like through experiments is necessary. Dyes have solubility. Thus, certain dyes need a dispersion point, and certain dyes need a reaction point. In this way, datafication of physical properties of dyes is also necessary. An exhaustion rate is present in a process of dyeing fabric with dyes. Thus, it is also necessary to know an exhaustion rate relating to whether dyes combine well with fabrics, dyes do not blend well with fabrics, or whether exhaustion is already completed. When dyes are exhausted on fabric, a degree to which the dyes do not come out of the fabric is a fixing rate. Knowing the fixing rate is related to preventing the color of the corresponding fabric from changing even after the fabric is washed after being dyed. Therefore, according to the present invention, dye characteristic data such as a chemical structure, a molecular weight, an absorption wavelength, a color strength, a solubility, a dispersion point, a reaction point, an exhaustion rate, and a fixing rate of a dye having a molecular structure may be secured through an experiment, and using the secured dye characteristic data, dye characteristic data for different concentrations for each dye may be generated through experiments for different concentrations for each dye. The dye characteristic data for different concentrations for each dye generated in this way may be mapped with existing raw data for different concentrations for each dye to generate a dye characteristic learning data set, and the dye characteristic learning data set may be utilized as condition data of an algorithm for correcting a dye mixing ratio. That is, the dye characteristic data may serve as a measure for choosing dyes to be mixed and a mixing ratio thereof in determining a dye mixing ratio and may be used when correcting the dye mixing ratio.

The processor 150 may generate a learning data set for different concentrations for each dye based on the dye characteristic data obtained through a dye characteristic experiment for each concentration. That is, the processor 150 may map the dye characteristic data with CCM raw data for each dye and each concentration and generate dye characteristic data for different concentrations for each dye. Then, the processor 150 may generate a learning data set through data augmentation based on the dye characteristic data for different concentrations for each dye. Here, the processor 150 may calculate dispersions and deviations for each concentration based on the dye characteristic data for different concentrations for each dye, calculate a distribution based on the dispersions and deviations for each concentration, and augment the dye characteristic data for different concentrations for each dye based on the distribution, thereby generating a learning data set.

The CCM raw data of the conventional CCM colorimeter 110 is data obtained through CCM color measurement after performing sample dyeing for different concentrations for each dye used in the corresponding dye works. Here, each dye is a dye used in the corresponding dye works, and thus the dyes may be limited to several tens to several hundreds of dyes. However, regarding different concentrations, since each concentration may be about 0% to 12% per monochromatic dye on site, and the corresponding ratio needs to be adjusted to be a real number, numerous concentration candidate groups exist. In addition, since three to four different monochromatic dyes are mixed for use in dyeing in many cases rather than dyeing using only one monochromatic dye, numerous dye mixing combinations are possible. Thus, even on site, it is common to set and use about five different concentrations for each dye in the CCM raw data. For example, CCM colorimetric values obtained by dyeing with different concentrations for each dye are input to the conventional CCM colorimeter 110, and as the corresponding raw data for different concentrations for each dye, only partial data relating to when the concentration is 0.1%, 0.5%, 1.0%, 3.0% and 5.0% is input. In the actual dyeing process, a dye mixing ratio may be Dye A (0.01%), Dye B (0.3%), Dye C (0.25%), and Dye D (0.17%). In this way, concentrations not included in the raw data may be used more in the actual dyeing process. To apply an AI model of Industry 4.0 on site, a learning data set should be addressed first. Many learning data sets are needed to derive a reliable result from running an AI model or an algorithm. That is, in order to apply a learning-based AI model for correcting a dye mixing ratio, many data sets are necessary, and data augmentation is required therefor.

Thus, according to the present invention, experimental concentrations for securing characteristic data for each dye of CCM raw data used on site may be set, and dye characteristic data for each concentration may be secured through an experiment with different concentrations for each dye. The processor 150 may receive the secured dye characteristic data for each concentration as an input and map the received dye characteristic data with the CCM raw data for each dye and each concentration to generate dye characteristic data for different concentrations for each dye. Then, the processor 150 may calculate dispersions and deviations for each concentration for the dye characteristic data for different concentrations for each dye and calculate a distribution based on the dispersions and deviations for each concentration. Here, the distribution may be in the form of a vector. When the distribution is calculated, the processor 150 may perform correlational analysis for each concentration through the distribution for different concentrations for the corresponding dye and may, based on a result of the correlational analysis, generate data relating to concentrations missing between concentrations set for experiments through an interpolation technique or an AI data augmentation technique. In this way, the processor 150 may generate a learning data set for different concentrations for each dye.

According to the present invention, a learning data set may be generated through augmentation of data relating to different concentrations for each dye based on fabric characteristic data and dye characteristic data, and using the learning data set, a dye mixing ratio which may correct CCM colorimetric deviation may be corrected. Accordingly, trial and error can be significantly reduced in dyeing, CCM color measurement, and dye mixing ratio correction that are repeatedly performed several times during a beaker test (B/T), experimental dyeing, on-site bulk dyeing, and the like, and in this way, cost reduction is possible in terms of time, manpower, water, dyes, an auxiliary agent, chemicals, energy, and the like.

When a learning data set is generated, the processor 150 may use at least one of the learning data set, a first CCM colorimetric value requested by a client, a second CCM colorimetric value measured in a dyeing process, a currently selected dye mixing ratio, and fabric characteristic data to correct the dye mixing ratio. Here, the processor 150 may calculate deviation between the first CCM colorimetric value and the second CCM colorimetric value, position the dye mixing ratio on a coordinate system, calculate concentrations for each dye for position movement of the dye mixing ratio based on dye characteristic data for each concentration and the deviation, and use at least one of the calculated concentrations for each dye, the learning data set, and the fabric characteristic data and calculate a correction value for the dye mixing ratio to reproduce a color requested by the client.

Hereinafter, a method for correcting a dye mixing ratio will be described in detail.

When a dyeing order including a first CCM colorimetric value requested by a client and a currently selected dye mixing ratio is input through the input module 130, the processor 150 may calculate deviation between the first CCM colorimetric value and a second CCM colorimetric value measured in a dyeing process, position the dye mixing ratio on a coordinate system, calculate concentrations for each dye for position movement of the dye mixing ratio based on dye characteristic data for each concentration and the deviation, and use at least one of the calculated concentrations for each dye, a learning data set, and fabric characteristic data and calculate a correction value for the dye mixing ratio to reproduce a color requested by the client. Here, the dye mixing ratio is a dye mixing ratio for reproducing the corresponding color on the corresponding fabric and may be a dye mixing ratio for a beaker test (B/T), experimental dyeing, and on-site bulk dyeing rather than a dye mixing ratio that can reproduce a color requested by the client on fabric requested by the client. A dye mixing ratio for reproducing the color requested by the client on the fabric requested by the client is finally set when a dyeing result from on-site bulk dyeing is confirmed as satisfactory. In this process, a beaker test (B/T), experimental dyeing, on-site bulk dyeing, and the like are repeatedly performed. Trial and error in these multiple steps consume large amounts of time, manpower, fabric, water, dyes, auxiliary agents, chemicals such as soda ash or sodium sulfate, energy, and the like and act as factors that hinder productivity and cost reduction. In order to significantly reduce such trial and error, the second CCM colorimetric value measured after a beaker test (B/T), experimental dyeing, and on-site bulk dyeing is given as input data. When the second CCM colorimetric value measured in a laboratory and on site is input, the processor 150 may calculate deviation between the first CCM colorimetric value requested by the client and the second CCM colorimetric value.

However, the deviation calculation on the CCM coordinate system is not shown as a distance of the dye mixing ratio. Therefore, visually showing positioning of the currently used dye mixing ratio on the coordinate system is helpful for on-site workers.

Thus, the processor 150 may perform positioning of the currently used dye mixing ratio on the coordinate system. In this way, positioning of the color requested by the client on the coordinate system and positioning of the current dye mixing ratio on the coordinate system may be checked. To this end, the processor 150 may utilize CCM colorimetric values for different concentrations for each dye, which are input as raw data, to perform positioning of the currently used dye mixing ratio.

When positioning of the dye mixing ratio is performed, the processor 150 may calculate concentrations for each dye for position movement of the dye mixing ratio using the position of the color requested by the client on the coordinate system and the position of the currently used dye mixing ratio on the coordinate system.

The processor 150 may calculate a fabric characteristic correction factor based on fabric characteristic data and may calculate a dye characteristic correction factor based on dye characteristic data. Since the current raw data is CCM colorimetric data for different concentrations for each dye relating to 100% cotton, it is necessary to calculate a correction factor (correction condition) that considers characteristics of fabric requested by the client.

When the fabric characteristic correction factor and the dye characteristic correction factor are calculated, the processor 150 may use the fabric characteristic correction factor and the dye characteristic correction factor and calculate concentrations to be added or subtracted to move the position of the currently used dye mixing ratio to the position of the color requested by the client. That is, based on the fabric characteristic correction factor and the dye characteristic correction factor, the processor 150 may calculate a correction value of different concentrations for each dye that is calculated based on dye characteristic data for each concentration.

As described above, when the first CCM colorimetric value requested by the client, the second CCM colorimetric value measured in a dyeing process, and a dye mixing ratio are input, the processor 150 may not only calculate deviation on the existing CCM coordinate system, but also position the dye mixing ratio, calculate a correction factor for position movement of the dye mixing ratio based on dye characteristic data and fabric characteristic data, and correct the dye mixing ratio using the correction factor.

In this way, it is possible to significantly reduce trial and error in correcting and finding a dye mixing ratio for reproducing the color requested by the client by considering characteristics of the fabric requested by the client and considering dye characteristic data of the currently used dye mixing ratio.

The case in which a dye mixing ratio is corrected when it is assumed that a color requested by the client is A on a coordinate system will be described with reference to FIG. 2. Dyes of a candidate group selected by a worker to conduct a beaker test (B/T) are a, b, and c, and concentrations of the corresponding dyes are 0.15%, 0.01%, and 0.20%, respectively. As shown in the coordinate system, it can be confirmed that a distance is present between B and A. In this case, in the conventional CCM colorimetric system, deviation relating to X, Y, and Z values is calculated and shown as numbers. Also, in the case of the conventional CCM colorimetric system used by purchasing a library license, a re-prescribed ratio of the used dyes is also shown.

However, the value relating to re-prescription may not be used as it is on site. This is because the CCM raw data is based on CCM colorimetric values obtained by dyeing 100% pure cotton with different concentrations for each dye, and thus the re-prescribed dye mixing ratio does not apply as it is to the fabric requested by the client. Therefore, it is necessary to consider fabric characteristic data, and it is necessary to experiment with dye characteristic data for each concentration to generate a learning data set including a chemical structure, a molecular weight, an absorption wavelength, a color strength, a solubility, a dispersion point, a reaction point, an exhaustion rate, a fixing rate, and the like of a dye, and analyze an amount of change of the corresponding dye mixing ratio through correlational analysis of dye characteristics based on the learning data set to adjust the dye mixing ratio of a, b, and c for moving from position B to position A to 0.13%, 0.15%, and 0.17%, respectively.

As described above, according to the present invention, a learning data set may be secured through augmentation of data relating to different concentrations for each dye based on fabric characteristic data that distinguishes fabric characteristics and experimental dye characteristic data that shows characteristics of dyes, and based on the secured learning data set, a dye mixing ratio correction algorithm for correcting a color difference between the CCM colorimetric value requested by the client and a CCM colorimetric value measured in a dyeing process may be used to reduce trial and error by reducing a color difference between the color requested by the client and the color in the dyeing process and find a dye mixing ratio.

Figure 3:
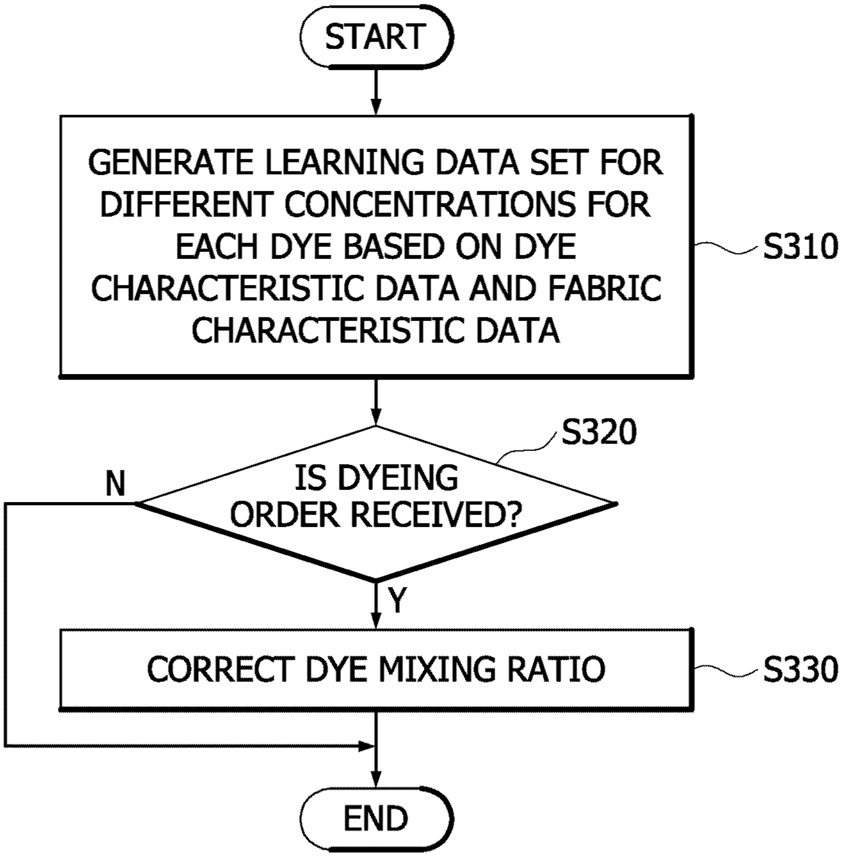
FIG. 3 is a flowchart for describing the method for correcting a dye mixing ratio according to one embodiment of the present invention.

FIG. 3 is a flowchart for describing the method for correcting a dye mixing ratio according to one embodiment of the present invention.

Referring to FIG. 3, the processor 150 generates a learning data set for different concentrations for each dye based on dye characteristic data and fabric characteristic data (S310). Detailed description of a method in which the processor 150 generates the learning data set will be given below with reference to FIG. 4.

After step S310 is performed, when a dyeing order including a first CCM colorimetric value requested by a client is received (S320), the processor 150 uses at least one of the first CCM colorimetric value, a currently selected dye mixing ratio, a second CCM colorimetric value measured in a dyeing process, the learning data set, and the fabric characteristic data and corrects the dye mixing ratio so that deviation between the first CCM colorimetric value and the second CCM colorimetric value is minimized (S330). Detailed description of a method in which the processor 150 corrects the dye mixing ratio will be given below with reference to FIG. 5.

Figure 4:
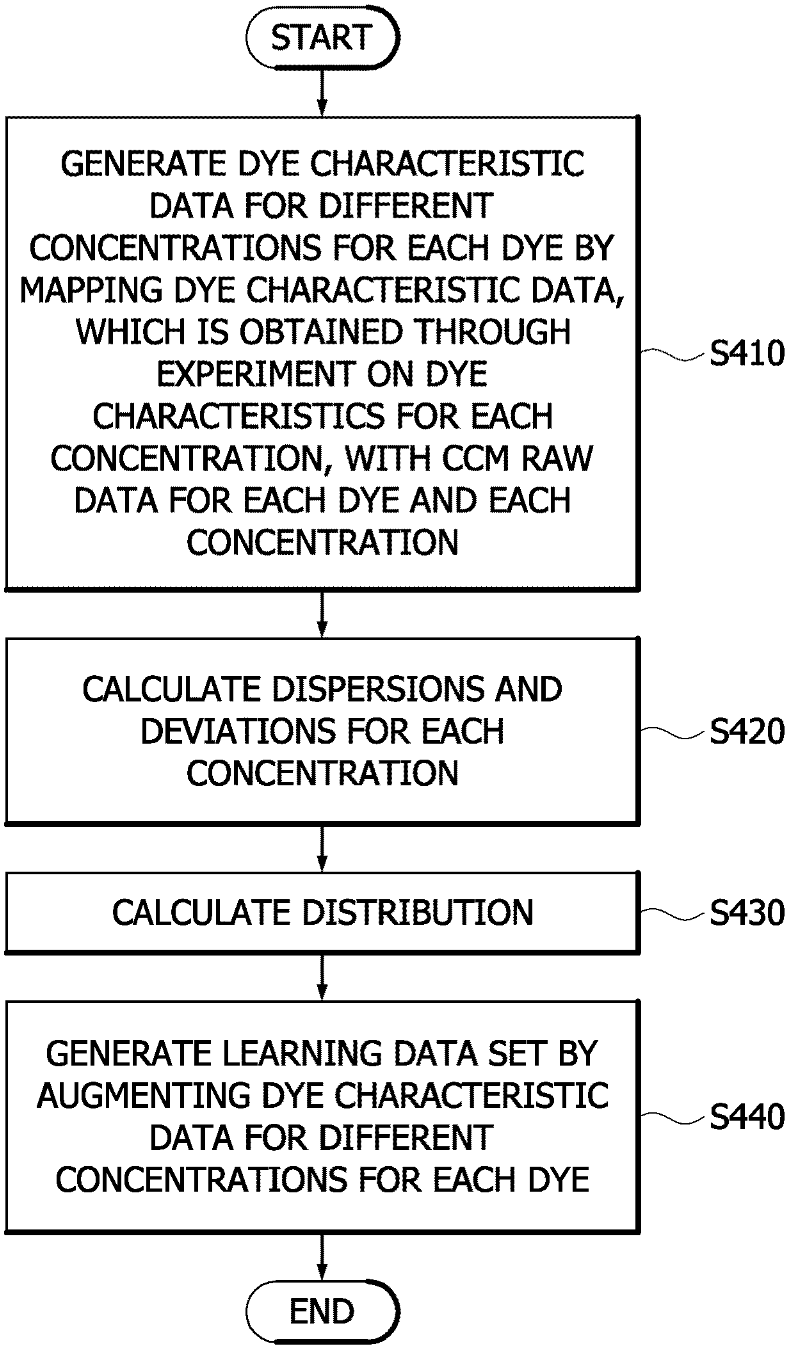
FIG. 4 is a flowchart for describing a method for generating a learning data set according to one embodiment of the present invention.

FIG. 4 is a flowchart for describing a method for generating a learning data set according to one embodiment of the present invention.

Referring to FIG. 4, the processor 150 generates dye characteristic data for different concentrations for each dye by mapping dye characteristic data, which is obtained through an experiment on dye characteristics for each concentration, with CCM raw data for each dye and each concentration (S410).

Then, the processor 150 calculates dispersions and deviations for each concentration based on the dye characteristic data for different concentrations for each dye (S420) and calculates a distribution based on the dispersions and deviations for each concentration (S430).

Then, the processor 150 generates a learning data set by augmenting the dye characteristic data for different concentrations for each dye based on the distribution (S440).

Figure 5:
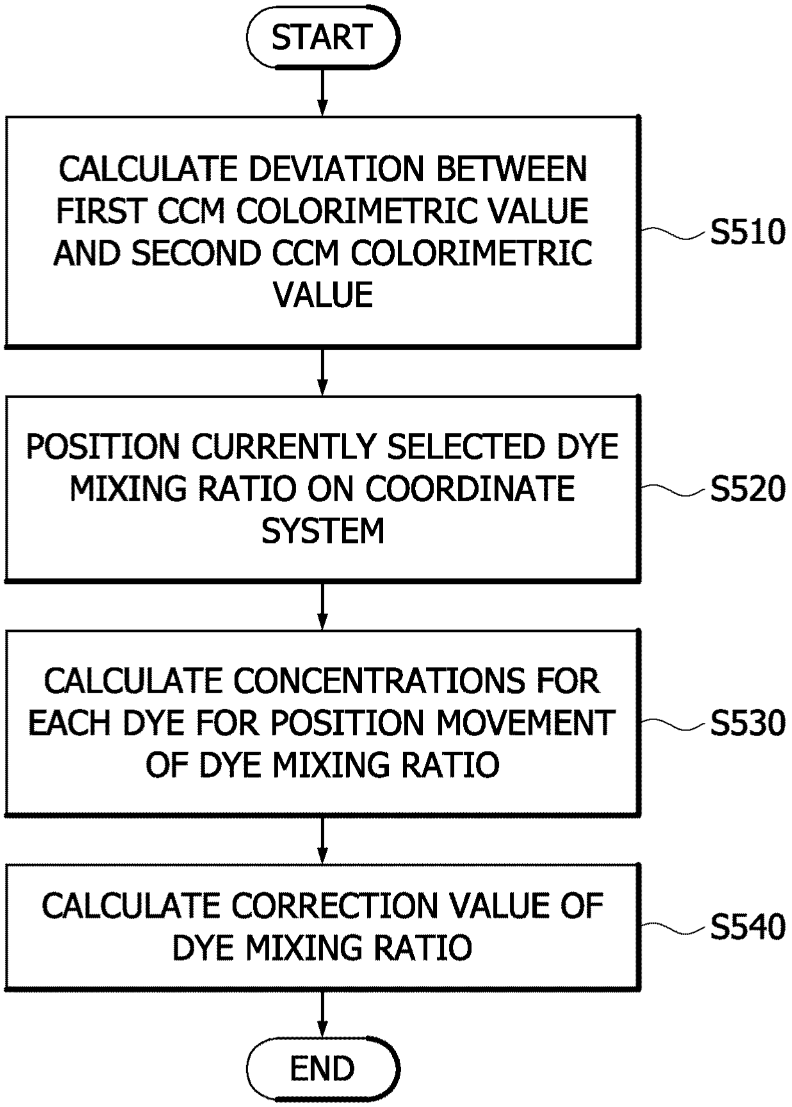
FIG. 5 is a flowchart for describing a method for correcting a dye mixing ratio upon reception of a dyeing order according to one embodiment of the present invention.

FIG. 5 is a flowchart for describing a method for correcting a dye mixing ratio upon reception of a dyeing order according to one embodiment of the present invention.

Referring to FIG. 5, the processor 150 calculates deviation between the first CCM colorimetric value requested by the client and the second CCM colorimetric value measured in the dyeing process (S510) and positions the currently selected dye mixing ratio on a coordinate system (S520).

Then, the processor 150 calculates concentrations for each dye for position movement of the dye mixing ratio based on the deviation and the dye characteristic data for each concentration (S530) and uses at least one of the calculated concentrations for each dye, the learning data set, and the fabric characteristic data and calculates a correction value for the dye mixing ratio to reproduce the color requested by the client (S540). Here, the processor 150 may calculate the correction factor for position movement of the dye mixing ratio based on the dye characteristic data and the fabric characteristic data and may use the correction factor to correct the calculated concentrations for each dye.

An apparatus for correcting a dye mixing ratio and a method thereof according to some embodiments of the present invention can correct CCM colorimetric deviation in consideration of fabric characteristic data and dye characteristic data. In this way, trial and error in correcting and finding a dye mixing ratio for reproducing a color requested by a client can be significantly reduced, and thus cost reduction and productivity improvement can be provided in relation to time, manpower, water, dyes, an auxiliary agent, chemicals, energy, and the like.

With the apparatus for correcting a dye mixing ratio and the method thereof according to some embodiments of the present invention, a learning data set is generated based on fabric characteristic data and dye characteristic data in addition to raw data provided by a basic CCM colorimetric system, and the dye mixing ratio is corrected based on the learning data set. In this way, trial and error can be significantly reduced in dyeing, CCM color measurement, and dye mixing ratio correction that are repeatedly performed several times during a beaker test (B/T), experimental dyeing, on-site bulk dyeing, and the like.

The present invention has been described above with reference to the embodiments illustrated in the drawings, but the description is merely illustrative, and those of ordinary skill in the art should understand that various modifications and other equivalent embodiments are possible therefrom. Therefore, the technical protection scope of the present invention should be defined by the claims below.

What is claimed is:

1. An apparatus for correcting a dye mixing ratio, the apparatus comprising:

a memory; and a processor connected to the memory, wherein, upon receiving a dyeing order including a first computer color matching (CCM) colorimetric value requested by a client, the processor:

calculates a deviation between the first CCM colorimetric value and a second CCM colorimetric value measured in a dyeing process, positions a dye mixing ratio on a coordinate system, determines concentration adjustments for each dye for moving the dye mixing ratio toward the first CCM colorimetric value based on the deviation, and corrects the dye mixing ratio based on the determined concentration adjustments, wherein the processor generates a learning data set for concentrations of each dye based on dye characteristic data and fabric characteristic data.

2. The apparatus of claim 1, wherein the processor;

calculates the concentration adjustments based on pre-stored dye characteristic data for concentrations of each dye, and calculates a correction value using at least one of the calculated concentrations, the dye characteristic data, and the fabric characteristic data to reproduce a color requested by the client.

3. The apparatus of claim 2, wherein the processor calculates a correction factor for the position movement of the dye mixing ratio based on the dye characteristic data and the fabric characteristic data and applies the correction factor to the concentration adjustments.

4. The apparatus of claim 1, wherein the processor generates the dye characteristic data for the concentrations for each dye by mapping the dye characteristic data with CCM raw data for each dye and each concentration and generates the learning data set through data augmentation based on the dye characteristic data for the concentrations for each dye.

5. The apparatus of claim 4, wherein the processor calculates dispersions and deviations for each concentration based on the dye characteristic data for the concentrations for each dye, calculates a distribution based on the dispersions and the deviations for each concentration, and augments the dye characteristic data for the concentrations for each dye based on the distribution, thereby generating the learning data set.

6. The apparatus of claim 1, wherein the dye characteristic data includes at least one of a chemical structure, a molecular weight, an absorption wavelength, a color strength, a solubility, a dispersion point, a reaction point, an exhaustion rate, and a fixing rate of a dye.

7. The apparatus of claim 1, wherein the fabric characteristic data includes at least one of a type, components, construction, a cotton count, a yarn twist number, a thickness, and a composition of fabric.

8. An apparatus for correcting a dye mixing ratio, the apparatus comprising:

a memory; and a processor connected to the memory, wherein the processor generates a learning data set for concentrations for each dye based on dye characteristic data and fabric characteristic data and uses at least one of the learning data set, a first CCM colorimetric value requested by a client, a second CCM colorimetric value measured in a dyeing process, a currently selected dye mixing ratio, and the fabric characteristic data to correct the dye mixing ratio.

9. The apparatus of claim 8, wherein the processor generates dye characteristic data for the concentrations for each dye by mapping the dye characteristic data with CCM raw data for each dye and each concentration and generates the learning data set through data augmentation based on the dye characteristic data for the concentrations for each dye.

10. The apparatus of claim 9, wherein the processor calculates dispersions and deviations for each concentration based on the dye characteristic data for the concentrations for each dye, calculates a distribution based on the dispersions and the deviations for each concentration, and augments the dye characteristic data for the concentrations for each dye based on the distribution, thereby generating the learning data set.

11. The apparatus of claim 8, wherein the dye characteristic data includes at least one of a chemical structure, a molecular weight, an absorption wavelength, a color strength, a solubility, a dispersion point, a reaction point, an exhaustion rate, and a fixing rate of a dye.

12. The apparatus of claim 8, wherein the fabric characteristic data includes at least one of a type, components, construction, a cotton count, a yarn twist number, a thickness, and a composition of fabric.

13. The apparatus of claim 8, wherein the processor calculates deviation between the first CCM colorimetric value and the second CCM colorimetric value, positions the dye mixing ratio on a coordinate system, calculates concentrations for each dye for position movement of the dye mixing ratio based on the deviation and the dye characteristic data for each concentration, and uses at least one of the calculated concentrations for each dye, the learning data set, and the fabric characteristic data and calculates a correction value for the dye mixing ratio to reproduce a color requested by the client.

14. A method for correcting a dye mixing ratio, the method comprising:

receiving, by a processor, a dyeing order including a first computer color matching (CCM) colorimetric value requested by a client;

calculating, by the processor, a deviation between the first CCM colorimetric value and a second CCM colorimetric value measured in a dyeing process;

positioning, by the processor, a dye mixing ratio on a coordinate system;

determining, by the processor, concentration adjustments for each dye for moving the dye mixing ratio toward the first CCM colorimetric value based on the deviation;

correcting, by the processor, the dye mixing ratio based on the determined concentration adjustments; and generating, by the processor, a learning data set for concentrations of each dye based on dye characteristic data and fabric characteristic data.

15. The method of claim 14, wherein determining the concentration adjustments includes:

calculating the concentration adjustments based on the dye characteristic data for concentrations of each dye; and calculating a correction value using at least one of the calculated concentrations, the dye characteristic data, and fabric characteristic data to reproduce a color requested by the client.

16. The method of claim 14, wherein generating the learning data set includes:

generating the dye characteristic data for the concentrations for each dye by mapping the dye characteristic data with CCM raw data for each dye and each concentration, calculating dispersions and deviations for each concentration based on the dye characteristic data for the concentrations for each dye, calculating a distribution based on the dispersions and the deviations for each concentration, and augmenting the dye characteristic data for the concentrations for each dye based on the distribution to generate the learning data set.

17. The method of claim 14, wherein the dye characteristic data includes at least one of a chemical structure, a molecular weight, an absorption wavelength, a color strength, a solubility, a dispersion point, a reaction point, an exhaustion rate, and a fixing rate of a dye.

18. The method of claim 14, wherein the fabric characteristic data includes at least one of a type, components, construction, a cotton count, a yarn twist number, a thickness, and a composition of fabric.

* * * * *